(12) United States Patent
Rabate et al.

(10) Patent No.: US 6,834,147 B2
(45) Date of Patent: Dec. 21, 2004

(54) THIN CONDUCTOR RIBBON

(75) Inventors: Patrice Rabate, Ermont (FR); Sophie Vanpoulle, Gif sur Yvette (FR); Xavier Andrieu, Bretigny sur Orge (FR); Frédéric Cariou, Chilly Mazarin (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 10/201,966

(22) Filed: Jul. 25, 2002

(65) Prior Publication Data

US 2003/0026563 A1 Feb. 6, 2003

(30) Foreign Application Priority Data

Jul. 26, 2001 (EP) ............................................. 01402021

(51) Int. Cl.⁷ ................................................. G02B 6/44
(52) U.S. Cl. ......................................................... 385/114
(58) Field of Search ................................ 385/114, 121, 385/100

(56) References Cited

U.S. PATENT DOCUMENTS

| 5,144,098 A | * | 9/1992 | VanDeusen | 174/36 |
|---|---|---|---|---|
| 5,208,889 A | | 5/1993 | Wheeler et al. | 385/114 |
| 5,253,318 A | * | 10/1993 | Sayegh et al. | 385/114 |
| 5,276,759 A | | 1/1994 | Nguyen et al. | 385/114 |
| 5,317,061 A | * | 5/1994 | Chu et al. | 525/200 |
| 5,457,762 A | * | 10/1995 | Lochkovic et al. | 385/114 |
| 5,580,654 A | * | 12/1996 | Cotter et al. | 428/375 |
| 5,761,363 A | * | 6/1998 | Mills | 385/114 |
| 5,981,064 A | | 11/1999 | Burack et al. | 428/375 |
| 6,175,677 B1 | * | 1/2001 | Yang et al. | 385/114 |
| 6,390,688 B1 | * | 5/2002 | Lutzen et al. | 385/87 |

FOREIGN PATENT DOCUMENTS

WO    WO 96/07185    *    3/1996

* cited by examiner

*Primary Examiner*—Neil Abrams
(74) *Attorney, Agent, or Firm*—Sughrue Mion, PLLC

(57) ABSTRACT

In a thin conductor cable configured as a flat ribbon cable and surrounded by a common exterior sheath, the plurality of thin conductors are adhesively grouped together using an emulsion polymer.

15 Claims, 1 Drawing Sheet

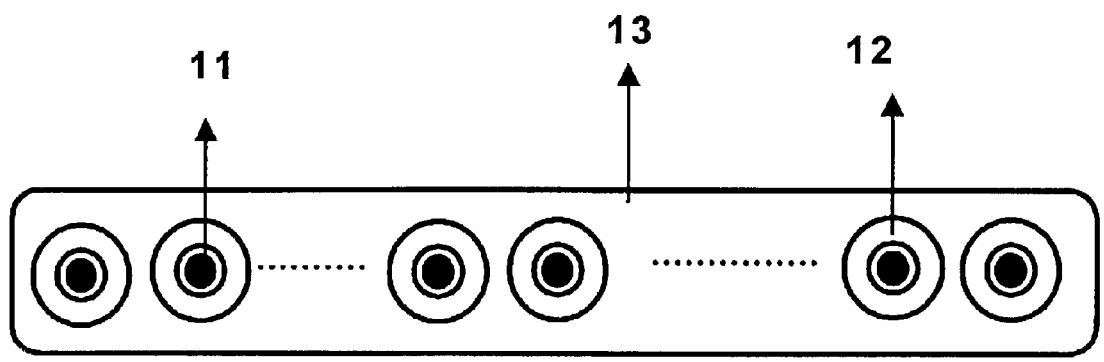

THIN CONDUCTOR RIBBON

OBJECT OF THE INVENTION

The invention relates to thin conductor cables. More particularly, the invention relates to a multiplicity of thin conductors configured as a flat ribbon cable and surrounded by a common exterior sheath. Thin conductors may be for example optical fibres or metal wires.

Moreover the present invention relates to optical fibre cables. More particularly, the invention relates to a multiplicity of optical fibres configured as a flat ribbon cable and surrounded by a common exterior sheath, which are currently widely used in the telecommunications field to transmit information.

STATE OF THE ART

In general, a ribbon of thin conductors, as optical fibres, is made with a multiplicity of conductors arranged parallel to each other. The thin conductors will be considered to be "adjacent" one another.

Thus, thin conductors ribbon are presently being made employing a plurality of thin conductors, each conductor having a circumscribing single or multi-layered coat from an ultraviolet light (UV) curable resins, such as UV acrylates.

Providing a plurality of coated thin conductors from a pay-off station and arranging the plurality in planar arrays makes the thin conductor ribbon. The planar arrays of thin conductors are passed through a ribbon die wherein an UV curable primary matrix ribbonizing layer material is coated there over to form uncured enveloping layers over the planar arrays of thin conductors.

The planar arrays, having the uncured enveloping layers are passed through one or more UV curing light sources which cause the UV curable matrix material to cure into cured primary matrix ribbonizing layers so forming the thin conductor ribbon members which are adjacent and lie in the same plane.

For example the optical fibre ribbon members are passed through a ribbon die wherein a UV curable secondary matrix layer material is coated over the primary matrix ribbonizing layers to form an uncured enveloping layer over the primary matrix layers. The secondary matrix material layer is cured by passing it through one or more UV curing light sources which cause the UV curable matrix material to cure into the secondary matrix ribbonizing layer so forming the ribbon optical fibre. For instance, see U.S. Pat. No. 6,175,677 to Yang et al., incorporated herein by reference.

As shown in Yang et al., an UV curable resins are used, the liquid resins are applied on the surface optical fibres and then the curing process is applied to a coating deposited on the surface of the optical fibres.

As a consequence, a need exists for less expensive coatings for thin conductor ribbon. This is, to reduce the production costs of thin conductor ribbon, for example through a modification in the curing process of the composition used to coat the thin conductor ribbon.

CHARACTERISATION OF THE INVENTION

In order to overcome the drawbacks mentioned above, the present invention provides for a thin conductor ribbon having a plurality of thin conductors that are adhesively grouped together using an emulsion polymer to form the ribbon cable. The polymer coated thin conductor is withstood to a drying process, which are well known in the art.

Using emulsion polymers is less expensive because of the cost of the furnace which is less expensive than UV furnace, the cost of the raw material also is less expensive than UV curable resin. Therefore, the overall cost of the manufacturing process is less expensive than UV curing process.

BRIEF DESCRIPTION OF THE DRAWING

A more detailed explanation of the invention is given in the following description based on the attached drawing in which:

The sole FIGURE is a cross sectional view of a thin conductor ribbon according to an embodiment of the invention.

DESCRIPTION OF THE INVENTION

The present invention provides a thin conductor ribbon comprising a plurality of coating thin conductors adhesively grouped together, the coating thin conductors being enveloped by an emulsion polymer matrix to form the ribbon.

The invention provides a thin conductor ribbon wherein the emulsion polymer can be an acrylate polymers, fluoro polymers, or the like.

The invention provides a thin conductor ribbon wherein said coating conductors are circumscribed by a protective sheath of emulsion polymer.

In a particular embodiment, said thin conductors arecoptical fibres.

The present invention also provides a method of manufacture of a ribbon characterised in that a plurality of coating thin conductors are guided through a ribbon die fed by one or more emulsion polymer.

The present invention also provides a method wherein the coating thin conductors are arranged in planar arrays. The present invention also provides a method wherein the emulsion polymer surrounds the coating thin conductors. The present invention also provides a method wherein the emulsion polymer coating thin conductors is exposed to an in-line drying process.

In a particular embodiment, the present invention provides a method of manufacture of a ribbon wherein thin conductors are optical fibres.

The invention is a thin conductor ribbon made substantially in the same manner and having the same structure as prior art conductor ribbon with one important distinction, instead of using an UV curable secondary matrix layer for enveloping the coating thin conductors, these are enveloped by an emulsion polymers as acrylate polymers, fluoro polymers or the like.

The sole FIGURE depicts the structure of an embodiment of the thin conductor ribbon or cable 13. The structure of the thin conductor ribbon 13 comprises a plurality of single or multi-layered thin conductors 12 aligned relative to one another in a planar relationship. Material as UV curable resin or the like coats each thin conductor 11. In general, the thin conductors 11 are passed through an ultraviolet UV acrylate material that cures under UV exposure.

The thin conductor ribbon 13 is made feeding a plurality of coated thin conductors 12 from a pay-off station and arranging the plurality in planar arrays. The planar arrays of coated thin conductors 12 are passed through a ribbon die that applies an emulsion polymer matrix to the coated thin conductors 12.

Following, the polymer coated thin conductor 13 is exposure to drying process by a furnace. The drying process dries and coalesces the emulsion polymer that offers excellent mechanical properties such as resistance to abrasion, to scratching, to humidity, and the like such as acrylate polymers, fluoro polymers as fluorinated ethylene-propylene copolymers (FEP), perfluoroalkyl ethers of polytetrafluoroethylene (PTFE) polymers, or the like surrounds the thin conductors. The emulsion polymer matrix 13 envelops the polymer coated thin conductors 12.

It will be noted that the structure of the thin conductor ribbon 13 is a plurality of single or multi-layered thin conductors circumscribed by a protective sheath, for instance emulsion polymer.

As a consequence, the coating composition useful for coating thin conductor has mechanical characteristics similar to other compositions used for the same purpose and that are subjected to other processes, such as UV curing method.

In fact, the manufacturing process of the invention is less costly due to the low cost of the emulsion polymers, a lot of different families of emulsion polymers can be used, for example some acrylate polymers that provides interesting low modulus characteristics.

It can be seen from the foregoing disclosure and series of examples that the present invention offers substantial advantages. Accordingly, the embodiment disclosed herein achieve the object of the invention; however, it should be appreciated by those skilled in the art that departures can be made from the following claims without parting from the spirit and scope of the invention.

What is claimed is:

1. Thin conductor ribbon comprising a plurality of coated thin conductors adhesively grouped together, characterised in that the coated thin conductors are enveloped by an emulsion polymer matrix to form the ribbon.

2. Thin conductor ribbon according to claim 1, wherein the emulsion polymer is an acrylate polymer or a fluoropolymer.

3. Thin conductor ribbon according to claim 1, wherein said thin conductors are circumscribed by a protective sheath of emulsion polymer.

4. Thin conductor ribbon according to claim 1, wherein said thin conductors are optical fibres.

5. Thin conductor ribbon according to claim 1, wherein the emulsion polymer is a perfluoralkyl esther of polytetrafluoroethylene polymers.

6. A thin conductor ribbon according to claim 1, wherein said emulsion polymer matrix indirectly envelopes said coated thin conductors.

7. Method of manufacture of a thin conductor ribbon comprising a plurality of coated thin conductors, characterised in that said coated thin conductors are guided through a ribbon die fed by one or more emulsion polymer.

8. Method according to claim 7, wherein said coated thin conductors are arranged in planar arrays.

9. Method according to claim 7, wherein the emulsion polymer surrounds the coated thin conductors.

10. Method according to claim 7, wherein the emulsion polymer coated thin conductors are exposed to an in-line drying process.

11. Method according to claim 7, wherein said coated thin conductors are coated optical fibres.

12. A method according to claim 7, wherein said emulsion polymer is a fluoro polymer.

13. A method according to claim 12, wherein said fluoro polymer is a fluorinated ethylene-propylene copolymer.

14. A method according to claim 12, wherein said fluoro polymer is a perfluoralkyl esther of polytetrafluoroethylene polymers.

15. A thin conductor ribbon comprising a plurality of coated thin conductors adhesively grouped together and enveloped by a polymer matrix to form the ribbon, wherein the polymer matrix is an emulsion polymer matrix.

* * * * *